(12) United States Patent
Zheng et al.

(10) Patent No.: US 10,274,300 B2
(45) Date of Patent: Apr. 30, 2019

(54) DEVICE AND METHOD FOR MEASURING THE THICKNESS AND POSITION TOLERANCE OF A WHEEL BOLT HOLE

(71) Applicant: CITIC Dicastal CO., LTD, Qinhuangdao (CN)

(72) Inventors: Yao Zheng, Qinhuangdao (CN); Xiaoguang Huang, Qinhuangdao (CN); Jiandong Guo, Qinhuangdao (CN); Weidong Liu, Qinhuangdao (CN); Bowen Xue, Qinhuangdao (CN)

(73) Assignee: CITIC Dicastal CO. LTD, Qinhuangdao (CN)

( * ) Notice: Subject to any disclaimer, the term of this patent is extended or adjusted under 35 U.S.C. 154(b) by 187 days.

(21) Appl. No.: 15/413,896

(22) Filed: Jan. 24, 2017

(65) Prior Publication Data
US 2017/0211921 A1    Jul. 27, 2017

(30) Foreign Application Priority Data
Jan. 27, 2016   (CN) .......................... 2016 1 0053707

(51) Int. Cl.
*G01B 5/14*    (2006.01)
*G01B 3/50*    (2006.01)
*G01B 5/06*    (2006.01)

(52) U.S. Cl.
CPC ............... *G01B 5/143* (2013.01); *G01B 3/50* (2013.01); *G01B 5/06* (2013.01)

(58) Field of Classification Search
None
See application file for complete search history.

(56) References Cited

U.S. PATENT DOCUMENTS

| | | | | |
|---|---|---|---|---|
| 4,129,950 A | * | 12/1978 | Weinhaus | G01B 3/30 33/203.19 |
| 4,202,106 A | * | 5/1980 | Olson | G01B 3/30 33/520 |
| 4,730,399 A | * | 3/1988 | Campbell | G01B 5/0025 33/203 |
| 5,033,003 A | * | 7/1991 | Lees, Sr. | G01M 1/02 33/203.18 |
| 5,074,048 A | * | 12/1991 | Yokomizo | G01B 7/28 33/203.13 |
| 5,174,032 A | * | 12/1992 | Beck | G01B 5/0025 33/203 |

(Continued)

*Primary Examiner* — Christopher W Fulton
(74) *Attorney, Agent, or Firm* — Maier & Maier, PLLC

(57) ABSTRACT

A device and method for measuring the thickness and position tolerance of a wheel bolt hole. The device includes a screw, a handle, a detection pillar and a base plate, where the handle and the base plate are fixed via the screw; the detection pillar is fixed onto the base plate through interference fit; and the detection pillar a bolt hole. The position tolerance and thickness of a bolt hole are measured simultaneously, and the labor intensity is reduced, and the existing bolt hole position tolerance detection tool can be modified for the use as the tool of the device, saving costs. The tool can detect the thickness of a bolt hole and qualitatively determine the range where the difference between the value of bolt hole thickness and the standard value approximately lies, and can be used for the grading of bolt hole thickness values based.

10 Claims, 2 Drawing Sheets

(56) References Cited

U.S. PATENT DOCUMENTS

| | | | | |
|---|---|---|---|---|
| 5,412,878 | A * | 5/1995 | Edman | G01B 5/0025 |
| | | | | 33/203 |
| 5,446,967 | A * | 9/1995 | Gender | G01B 5/255 |
| | | | | 33/203.18 |
| 6,055,735 | A * | 5/2000 | Weihrauch | G01B 5/08 |
| | | | | 33/203 |
| 7,877,890 | B2 * | 2/2011 | Weber | A61B 90/36 |
| | | | | 33/613 |
| 7,926,189 | B1 * | 4/2011 | Pellegrino | G01B 5/255 |
| | | | | 33/203.18 |
| 8,782,867 | B2 * | 7/2014 | Verdier | F16B 1/0071 |
| | | | | 29/407.01 |
| 9,956,572 | B2 * | 5/2018 | Xue | B05B 12/32 |
| 2002/0189114 | A1 * | 12/2002 | Voeller | G01B 5/255 |
| | | | | 33/203.18 |
| 2010/0133067 | A1 * | 6/2010 | Martinelli | B65G 47/847 |
| | | | | 198/470.1 |
| 2011/0113637 | A1 * | 5/2011 | Inoue | B60B 27/0005 |
| | | | | 33/203 |
| 2016/0207098 | A1 * | 7/2016 | Zhu | B22D 18/04 |

\* cited by examiner

DEVICE AND METHOD FOR MEASURING THE THICKNESS AND POSITION TOLERANCE OF A WHEEL BOLT HOLE

TECHNICAL FIELD

The invention relates to the field of industrial measurement and in particular to a device and method for measuring the thickness and position tolerance of a wheel bolt hole.

BACKGROUND ART

After the aluminum alloy wheel is machined, there is a need for measuring the thickness and position tolerance of wheel bolt holes to determine whether each bolt hole of the wheel is accurately assembled during vehicle assembly. Conventionally, the thickness and position tolerance of the wheel bolt holes require to be measured separately. During the thickness measurement of the wheel bolt holes, tools such as calipers are required. During the position tolerance measurement of the wheel bolt holes, multi-claw complementary measurement tools designed based on wheel bolt hole distribution are required. It is desired for those skilled in the prior art to develop a convenient measurement tool capable of implementing the above two functions.

SUMMARY OF THE INVENTION

Therefore, an object of the invention is to provide a measurement tool for simultaneously measuring the thickness and position tolerance of a wheel bolt hole.

In one aspect of the invention, a device for measuring the thickness and position tolerance of a wheel bolt hole is provided, which comprises a screw (1), a handle (2), a detection pillar (3) and a base plate (4) and is characterized in that: the handle (2) and the base plate (4) are fixed together via the screw (1); the detection pillar (3) is fixed onto the base plate (4) through interference fit; and the detection pillar (3) is configured to fit the dimension of an acceptable bolt hole.

In a preferred aspect of the invention, the detection pillar (3) is arranged such that the upper surface is inclined, with a higher end thereof being arranged high above the edge of a bolt hole of standard depth when the detection pillar (3) is put into the bolt hole, with a lower end thereof being arranged below the edge of a bolt hole of standard depth when the detection pillar (3) is put into the bolt hole.

In a preferred aspect of the invention, the higher end of the lower surface of the detection pillar (3) is arranged such that when the detection pillar (3) is put into a bolt hole of standard depth, the distance above the bolt hole edge is 30%-50% of the allowable deviation of the bolt hole depth, and the lower end of the lower surface of the detection pillar (3) is arranged such that when the detection pillar (3) is put into a bolt hole of standard depth, the distance below the bolt hole edge is 30%-50% of the allowable deviation of the bolt hole depth.

In a preferred aspect of the invention, the higher end of the lower surface of the detection pillar (3) is arranged such that when the detection pillar (3) is put into a bolt hole of standard depth, the distance above the bolt hole edge is 0.2-0.7 mm, and the lower end is arranged such that when the detection pillar (3) is put into a bolt hole of standard depth, the distance below the bolt hole edge is 0.2-0.7 mm.

In a preferred aspect of the invention, the lower surface of the detection pillar (3) comprises a step-shaped edge (5), the step-shaped edge (5) comprises 4-8 step surfaces, and the elevation differences between the individual step surfaces of the step-shaped edge (5) and the surface of a bolt hole of standard depth are uniformly distributed within the upper and lower limits of bolt hole depth allowable deviation.

In another aspect of the invention, a method for measuring the thickness and position tolerance of a wheel bolt hole is provided, which is characterized in that: the method comprises the following steps: A) putting the front surface of a wheel hub to be detected flat on a detection platform, holding the handle (2) and inserting the detection pillar (3) into a bolt hole in the vertical direction; B) if the detection pillar (3) is fully retained in the bolt hole, determining that the position tolerance of the bolt hole is acceptable; and C) pressing the base plate (4) against the wheel hub flange plane, touching the bolt hole counter bore position by a hand on the hub front surface, and determining whether the bolt hole edge and the detection pillar (3) are aligned with each other.

In a preferred aspect of the invention, the detection pillar (3) is arranged such that the upper surface is inclined, with the higher end thereof being arranged high above the edge of a bolt hole of standard depth when the detection pillar (3) is put into the bolt hole, with the lower end thereof being arranged below the edge of a bolt hole of standard depth when the detection pillar (3) is put into the bolt hole, and in step C), if the upper elevation difference of the detection pillar (3) is considered by touching to be above the counter bore and the lower elevation difference is below the counter bore, the thickness of the bolt hole is acceptable, and if either of the upper and lower elevation differences does not confirm to the foregoing, the thickness of the bolt hole is unacceptable.

In a preferred aspect of the invention, the lower surface of the detection pillar (3) comprises a step-shaped edge (5), the step-shaped edge (5) comprises 4-8 step surfaces, and the elevation differences between the individual step surfaces of the step-shaped edge (5) and the surface of a bolt hole of standard depth are uniformly distributed within the upper and lower limits of bolt hole depth allowable deviation. In step C), the elevation difference between the individual step surfaces of the step-shaped edge (5) of the detection pillar (3) and the bolt hole edge surface is determined by touching, and the number of the steps arranged high above the bolt hole edge surface and the number of the steps arranged below the bolt hole edge surface are calculated.

In a further preferred aspect of the invention, if both the number of the steps arranged high above the bolt hole edge surface and the number of the steps arranged below the bolt hole edge surface are not zero, the depth of the bolt hole is recorded as acceptable.

The technical solution of the invention has the advantages as follows: the position tolerance and thickness of the bolt hole are measured simultaneously, the labor intensity is greatly reduced, and the existing bolt hole position tolerance detection tool can be modified for the use as the tool of the device, greatly saving the tool manufacturing cost. The tool can not only detect the thickness of a bolt hole but also qualitatively determine the range where the difference between the value of bolt hole thickness and the standard value approximately lies, and can be used for the grading of bolt hole thickness values based on the degree of approaching to the standard value.

BRIEF DESCRIPTION OF THE DRAWINGS

The embodiments of the invention will be described below in details with reference to the accompanying drawings, wherein.

Figure 1:
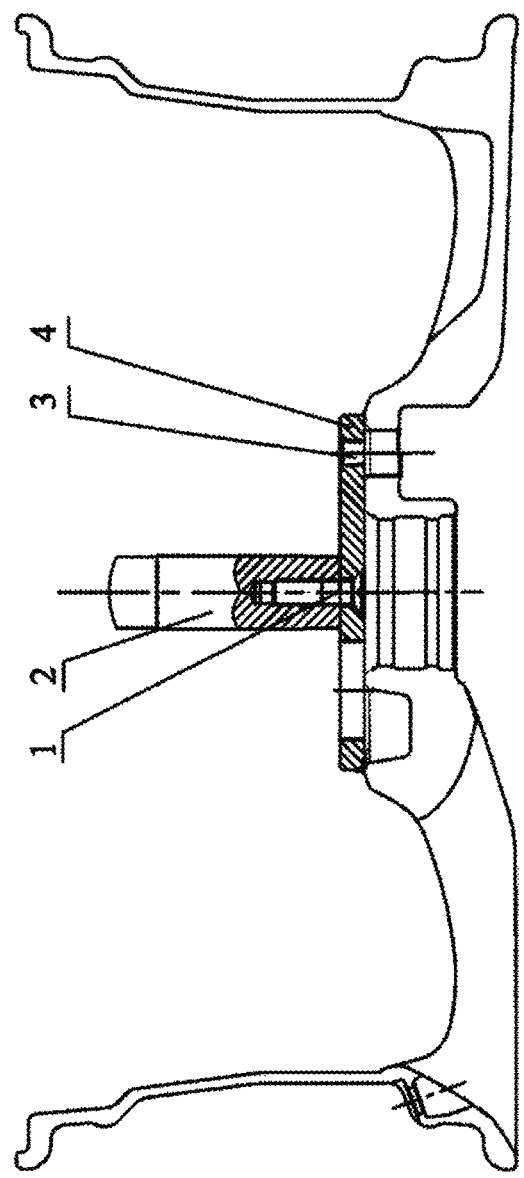
FIG. 1 is a view of the device of the invention in the use state.
Figure 2:
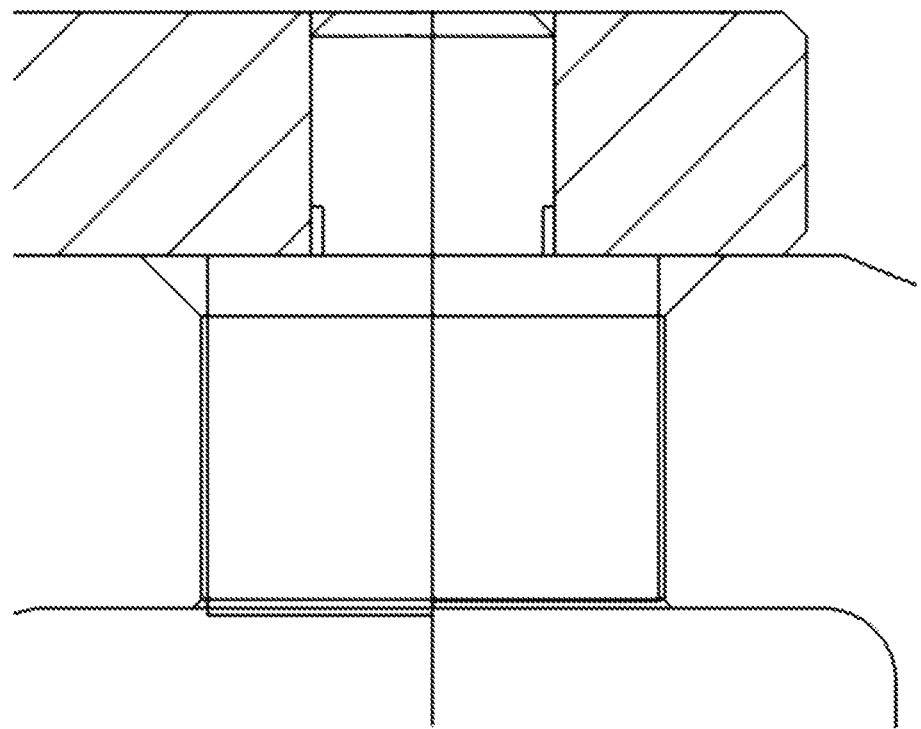
FIG. 2 is a sectional view of a bolt hole fitting part of the device of the invention in the use state.
Figure 3:
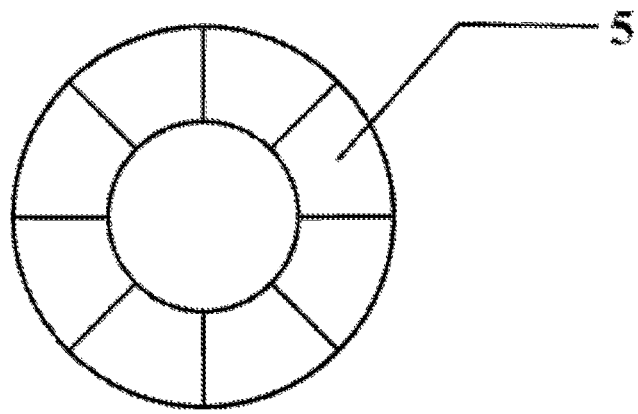
FIG. 3 is a bottom view of a detection pillar (3) of the device of the invention.

wherein: 1—screw, 2—handle, 3—detection pillar, 4—base plate, 5—step—shaped edge.

DETAILED DESCRIPTION OF EMBODIMENTS

Example 1

The device of this example comprises a screw (1), a handle (2), a detection pillar (3) and a base plate (4), the handle (2) and the base plate (4) are fixed together via the screw (1); the detection pillar (3) is fixed onto the base plate (4) by interference fit; and the detection pillar (3) is configured to fit the dimension of an acceptable bolt hole. The detection pillar (3) is arranged such that the upper surface is inclined, with the higher end thereof being arranged high above the edge of a bolt hole of standard depth when the detection pillar (3) is put into the bolt hole, with the lower end thereof being arranged below the edge of a bolt hole of standard depth when the detection pillar (3) is put into the bolt hole. The higher end of the lower surface of the detection pillar (3) is arranged such that when the detection pillar (3) is put into a bolt hole of standard depth, the distance above the bolt hole edge is 30% of the allowable deviation of the bolt hole depth, and the lower end of the lower surface of the detection pillar (3) is arranged such that when the detection pillar (3) is put into a bolt hole of standard depth, the distance below the bolt hole edge is 30% of the allowable deviation of the bolt hole depth. Specifically, the higher end of the lower surface of the detection pillar (3) is arranged such that when the detection pillar (3) is put into a bolt hole of standard depth, the distance above the bolt hole edge is 0.2-0.7 mm, and the lower end of the lower surface of the detection pillar (3) is arranged such that when the detection pillar (3) is put into a bolt hole of standard depth, the distance below the bolt hole edge is 0.2-0.7 mm.

Example 2

The device of this example comprises a screw (1), a handle (2), a detection pillar (3) and a base plate (4), the handle (2) and the base plate (4) are fixed together via the screw (1); the detection pillar (3) is fixed onto the base plate (4) by interference fit; and the detection pillar (3) is configured to fit the dimension of an acceptable bolt hole. The lower surface of the detection pillar (3) comprises a step-shaped edge (5), the step-shaped edge (5) comprises 4-8 step surfaces, and the elevation differences between the individual step surfaces of the step-shaped edge (5) and the surface of a bolt hole of standard depth are uniformly distributed within the upper and lower limits of bolt hole depth allowable deviation.

Example 3

Using the device of example 1, the device of example 2 and the caliper for measuring the position tolerance and thickness of a bolt hole, 6 batches of bolt holes (20 for each batch) are measured, and the values of position tolerance and thickness of totally 120 aluminum alloy wheel hubs are recorded.

The structure of the position tolerance measurement tools of the prior art differs from the tool of example 1 in that: the detection pillar (3) is configured not to fit the thickness of a bolt hole.

In the operation, the front surface of the wheel hub is placed on the platform, the handle (2) is held by a hand such that the detection pillar (3) faces the holt hole in the vertical direction, and if the detection pillar (3) is fully retained in the bolt hole, the position tolerance of the bolt hole is acceptable; after putting in place, the base plate (4) presses against the hub flange plane.

For the device of example 1, the bolt hole counter bore position is touched by a hand on the hub front surface, if the upper elevation difference of the detection pillar (3) is considered to be above the counter bore and the lower elevation difference is below the counter bore, the thickness of the bolt hole is acceptable, and if either of the upper and lower elevation differences does not confirm to the foregoing, the thickness of the bolt hole is unacceptable.

For the device of example 2, in step C), the elevation difference between the individual step surfaces of the step-shaped edge (5) of the detection pillar (3) and the bolt hole edge surface is determined by touching, and the number of the steps arranged high above the bolt hole edge surface and the number of the steps arranged below the bolt hole edge surface are calculated. If both the number of the steps arranged high above the bolt hole edge surface and the number of the steps arranged below the bolt hole edge surface are not zero, the depth of the bolt hole is recorded as acceptable.

The measurement results show that using the measurement tool of example 1 or example 2 of the invention, the mean time required for measuring one wheel hub is 19 seconds and 41 seconds respectively. However, it would take several minutes using the measurement tool of the prior art. There has no significant difference in measurement result between the measurement device of the invention and the measurement tool of the prior art.

It can be seen that during the measurement of thickness and position tolerance of wheel hub bolt holes, two separate tools are required for thickness and position tolerance measurements, and the thickness measurements of bolt holes are performed one by one with low efficiency. The device of the invention integrates the two functions in one body, provides convenience in measurement, and improves the efficiency of measurement staff while reducing the labor intensity.

The invention claimed is:

1. A device for measuring the thickness and position tolerance of wheel bolt holes of a wheel hub, comprising:
   a screw, a handle, detection pillars and a base plate, wherein the handle and the base plate are fixed together via the screw; the detection pillars are fixed onto the base plate through interference fit; and each detection pillar is configured to fit the dimension of an acceptable bolt hole,
   wherein the detection pillar is arranged such that the upper surface is inclined, with a higher end thereof being arranged high above the edge of a bolt hole of standard depth when the detection pillar is put into the bolt hole, with a lower end thereof being arranged below the edge of a bolt hole of standard depth when the detection pillar is put into the bolt hole;
   wherein when the detection pillars are fully retained in the corresponding bolt holes during operation, position tolerances of the bolt holes are acceptable, and, then, the base plate is put into place and pressed against a hub flange plane of the wheel hub; and wherein if the upper elevation difference of the detection pillar is considered by touching to be above the counter bore and the lower elevation difference is below the counter bore, the thickness of the bolt hole is acceptable, and if either of the upper and lower elevation differences does not confirm to the foregoing, the thickness of the bolt hole is unacceptable.

2. The device according to claim 1, wherein the higher end of the lower surface of the detection pillar is arranged such that when the detection pillar is put into a bolt hole of standard depth, the distance above the bolt hole edge is 30%-50% of the allowable deviation of the bolt hole depth, and the lower end of the lower surface of the detection pillar is arranged such that when the detection pillar is put into a bolt hole of standard depth, the distance below the bolt hole edge is 30%-50% of the allowable deviation of the bolt hole depth.

3. A method for measuring the thickness and position tolerance of an aluminum alloy wheel bolt hole using the device of claim 2, comprising:
   A) putting the front surface of a wheel hub to be detected flat on a detection platform, holding the handle and inserting the detection pillar into a bolt hole in the vertical direction;
   B) if the detection pillar is fully retained in the bolt hole, determining that the position tolerance of the bolt hole is acceptable;
   C) pressing the base plate against the wheel hub flange plane, touching the bolt hole counter bore position by a hand on the hub front surface, and determining whether the bolt hole edge and the detection pillar are aligned with each other.

4. The method according to claim 3, wherein the lower surface of the detection pillar comprises a step-shaped edge, and the step-shaped edge comprises 4-8 step surfaces, and the elevation differences between the individual step surfaces of the step-shaped edge and the surface of a bolt hole of standard depth are uniformly distributed within the upper and lower limits of bolt hole depth allowable deviation, wherein in step C), the elevation difference between the individual step surfaces of the step-shaped edge of the detection pillar and the bolt hole edge surface is determined by touching, and the number of the steps arranged high above the bolt hole edge surface and the number of the steps arranged below the bolt hole edge surface are calculated.

5. The method according to claim 3, wherein if both the number of the steps arranged high above the bolt hole edge surface and the number of the steps arranged below the bolt hole edge surface are not zero, the depth of the bolt hole is recorded as acceptable.

6. The device according to claim 1, wherein the higher end of the lower surface of the detection pillar is arranged such that when the detection pillar is put into a bolt hole of standard depth, the distance above the bolt hole edge is 0.2-0.7 mm, and the lower end is arranged such that when the detection pillar is put into a bolt hole of standard depth, the distance below the bolt hole edge is 0.2-0.7 mm.

7. The device according to claim 6, wherein the lower surface of the detection pillar comprises a step-shaped edge, and the step-shaped edge comprises 4-8 step surfaces, and the elevation differences between the individual step surfaces of the step-shaped edge and the surface of a bolt hole of standard depth are uniformly distributed within the upper and lower limits of bolt hole depth allowable deviation.

8. A method for measuring the thickness and position tolerance of an aluminum alloy wheel bolt hole using the device of claim 6, comprising:
   A) putting the front surface of a wheel hub to be detected flat on a detection platform, holding the handle and inserting the detection pillar into a bolt hole in the vertical direction;
   B) if the detection pillar is fully retained in the bolt hole, determining that the position tolerance of the bolt hole is acceptable;
   C) pressing the base plate against the wheel hub flange plane, touching the bolt hole counter bore position by a hand on the hub front surface, and determining whether the bolt hole edge and the detection pillar are aligned with each other.

9. The method according to claim 8, wherein the lower surface of the detection pillar comprises a step-shaped edge, and the step-shaped edge comprises 4-8 step surfaces, and the elevation differences between the individual step surfaces of the step-shaped edge and the surface of a bolt hole of standard depth are uniformly distributed within the upper and lower limits of bolt hole depth allowable deviation, in step C), the elevation difference between the individual step surfaces of the step-shaped edge of the detection pillar and the bolt hole edge surface is determined by touching, and the number of the steps arranged high above the bolt hole edge surface and the number of the steps arranged below the bolt hole edge surface are calculated.

10. The method according to claim 8, wherein if both the number of the steps arranged high above the bolt hole edge surface and the number of the steps arranged below the bolt hole edge surface are not zero, the depth of the bolt hole is recorded as acceptable.

* * * * *